(12) United States Patent
Guo et al.

(10) Patent No.: US 9,900,575 B2
(45) Date of Patent: Feb. 20, 2018

(54) NAKED-EYE 3D IMAGE FORMING METHOD AND SYSTEM

(71) Applicant: Shenzhen China Star Optoelectronics Technology Co., Ltd., Shenzhen, Guangdong (CN)

(72) Inventors: Dongsheng Guo, Guangdong (CN); Yu-Yeh Chen, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 273 days.

(21) Appl. No.: 14/909,098

(22) PCT Filed: Aug. 28, 2015

(86) PCT No.: PCT/CN2015/088427
§ 371 (c)(1),
(2) Date: Jan. 29, 2016

(87) PCT Pub. No.: WO2017/024626
PCT Pub. Date: Feb. 16, 2017

(65) Prior Publication Data
US 2017/0171526 A1    Jun. 15, 2017

(30) Foreign Application Priority Data

Aug. 13, 2015 (CN) .......................... 2015 1 0497748

(51) Int. Cl.
*H04N 13/00* (2006.01)
*H04N 13/04* (2006.01)

(52) U.S. Cl.
CPC ..... *H04N 13/0029* (2013.01); *H04N 13/0402* (2013.01); *H04N 13/0459* (2013.01); *H04N 13/0497* (2013.01)

(58) Field of Classification Search
CPC ........... H04N 13/0404; H04N 13/0402; H04N 13/0459; H04N 13/0029; H04N 13/0415; G02B 2027/0134; G02B 27/2235
(Continued)

(56) References Cited

U.S. PATENT DOCUMENTS 9,022,564 B2 * 5/2015 Watanabe .............. G02B 27/22
348/54
2004/0008251 A1 * 1/2004 Mashitani .......... H04N 13/0409
348/51
(Continued)

FOREIGN PATENT DOCUMENTS

CN          203149211 U       8/2013
CN          103279942 A       9/2013
(Continued)

*Primary Examiner* — Nathnael Aynalem
(74) *Attorney, Agent, or Firm* — Andrew C. Cheng

(57) ABSTRACT

A naked-eye 3D image forming method. The method includes: determining an outline coordinate of display image of display device in a vertical plane; determining a coordinate of an observation point R including height h, and distance l; inclining the display device toward the horizontal plane to obtain a tilt angle θ; according to coordinates of the two points of the original image on the horizontal plane, the height h, length l and angle θ to calculate an outline coordinate of a present image; according to all coordinate points contained by the outline coordinate of the preset image, the height h, the length l and the tilt angle θ to calculate projection coordinate points on the display screen; converting the projection coordinate points into digital signals and inputting to the image expanding control module such that the display device forms the preset image on an image on the vertical plane.

8 Claims, 3 Drawing Sheets

(58) Field of Classification Search
USPC .............................................. 348/43, 46, 51
See application file for complete search history.

(56) References Cited

U.S. PATENT DOCUMENTS

2007/0263088 A1* 11/2007 Park ................... H04N 13/0404
  348/59
2015/0256818 A1* 9/2015 de la Barre ........ H04N 13/0409
  348/51

FOREIGN PATENT DOCUMENTS

| CN | 103716612 A | 4/2014 |
| CN | 104702939 A | 6/2015 |
| JP | 2010113225 A | 5/2010 |
| TW | 201426011 A | 7/2014 |
| WO | 2011036798 A1 | 3/2011 |

\* cited by examiner

NAKED-EYE 3D IMAGE FORMING METHOD AND SYSTEM

CROSS REFERENCE

This application claims the priority of Chinese Patent Application No. 201510497748.1, entitled "naked-eye 3D image forming method and system", filed on Aug. 13, 2015, the disclosure of which is incorporated herein by reference in its entirety.

FIELD OF THE INVENTION

The present invention relates to a display technology field, and more particularly to a naked-eye 3D image forming method and system.

BACKGROUND OF THE INVENTION

A term "D" in "3D" is a first letter of an english word, Dimension. The 3D means a three-dimensional space. Comparing with a 2D display, a 3D technology can make an image to be more realistic and stereoscopic so that an image is not limited to a flat plane of a display screen. It seems to be able to walk out of the screen, allowing viewers have immersive feeling.

Although the 3D display technology has many categories, however, the basic principle is similar as that using human eyes to respectively receive different pictures at left and right, then, the brain superimposes and regenerates the pictures in order to form a three-dimensional and directional effect image having front-after up-down, left-right and far-closed. In a glass type 3D technology, three main types are provided: a color difference type, a polarizing type and a film-attached naked-eye type. However, the most and conventional 3D display technology require wearing a glass to view such that a flicker is easily to generate and not easy to be applied. The film-attached naked-eye type has a high cost, and bad in image forming effect.

SUMMARY OF THE INVENTION

The purpose of the present disclosure is to provide a naked-eye 3D image forming method and system in order to realize a naked-eye 3D image, easily to be applied and ensure the image forming effect.

The present disclosure provides a naked-eye 3D image forming system, comprising: a horizontal plane and a vertical plane perpendicular to the horizontal plane, a display device, a supporting body for fixing the display device; wherein, a control system in the display device is provided with an image expanding control module; the supporting body installs the display device on the vertical plane, and inclines the display device toward the vertical plane; a display screen of the display device is disposed with a tilt angle with respective to the horizontal plane; and wherein, the image expanding control module is used for changing a dimension of a display image of the display device after the display device is inclined in order to realize forming a three-dimensional image on the vertical plane.

Wherein, the supporting body includes a carrying plate and a fixing plate having an included angle with respect to the carrying plate; the fixing plate is fixed to the vertical plane and is in parallel with the vertical plane; the carrying plate carries the display device, and the display screen is in parallel with the carrying plate.

The present disclosure provides a naked-eye 3D image forming method, comprising:

determining an outline coordinate of a display image of a display device in a vertical plane, wherein, the display image is an original image, and a middle point of a straight line formed by two points of the original image on the horizontal plane is an origin O;

determining a coordinate of an observation point R which is calculated from the observation point R to the original image, wherein, the coordinate of the observation point R includes a height h with respect to the horizontal plane, and a distance l from the observation point R to the origin;

inclining the display device on the vertical plane toward the horizontal plane along a direction away from the display screen of the display device such that the display screen of the display device has a tilt angle $\theta$ with respect to the horizontal plane;

according to coordinates of the two points of the original image on the horizontal plane, the height h, the length l and the tilt angle to calculate $\theta$ to calculate an outline coordinate of a present image formed by the original image on the vertical plane. Wherein, coordinates of two points of the outline coordinate of the present image on the horizontal plane are the same as coordinates of the two points of the original image on the horizontal plane;

according to all coordinate points contained by the outline coordinate of the preset image, the height h, the length l and the tilt angle $\theta$ to calculate projection coordinate points on the display screen projected by the all coordinate points contained by the outline coordinate of the preset image, wherein, a connection line between the observation point R and the outline coordinate of the present image is a straight line, and the outline coordinate of the present image is at the straight line; and converting the projection coordinate points on the display screen projected by the all coordinates contained by the outline coordinate of the preset image into digital signals and inputting the digital signals to the image expanding control module of the display device such that the display device forms the preset image on the vertical plane.

Wherein, each of the projection coordinate points on the display screen corresponds to one pixel unit of the display device.

Wherein, an outline of the original image is a rectangle, the outline coordinate of the original image is locations where four vertexes of the rectangle are located; the four vertexes along a clockwise direction are respectively a vertex A, a vertex B, a vertex C and a vertex D; wherein, coordinates of the vertex C and vertex D are known fixed values. The origin is located at the middle of the vertex C and vertex D.

Wherein, an outline of an image displayed on the display screen after the display screen is titled is a rectangle, an outline coordinate of the image displayed on the display screen after the display screen are locations where four vertexes of the rectangle are located. The four vertexes along a clockwise direction are respectively a vertex F, a vertex E, and the vertex C and the vertex D.

Wherein, an outline of the preset image is a rectangle smaller than the size of the original image. An outline coordinate of the preset image are locations of four vertexes of the rectangle formed by the preset image.

Wherein, the four vertexes of the outline coordinate of the preset image along a clockwise direction are respectively a vertex J (0, −y2, z2), a vertex K (0, y2, z2) and the vertex C and the vertex D; the function y2 satisfies a following condition:

$$y2 = \frac{w \times \sqrt{l^2 + (h-z2)^2}}{\sqrt{(l+xl)^2 + (h-zl)^2}};$$

the function z2 satisfies a following condition $$z2 = \frac{xl \times (h-zl)}{(l+xl)} + zl;$$

wherein, w is a coordinate value of the vertex C and the vertex D on the x-axis, z1 is a coordinate value of the vertex F and the vertex E on the z-axis.

Wherein, a projection coordinate point Z (x4, y4, z4) on the display screen projected by an arbitrary coordinate point Y (0, y3, z3) in the all coordinates contained by the outline coordinate of the preset image satisfies a flowing condition:

$$z4 = \frac{z3 \times \tan(\theta)}{\left(\frac{(h-z3)}{l} + \tan(\theta)\right)}, \quad y4 = \frac{y3 \times \sqrt{(h-z4)^2 + (l+x4)^2}}{\sqrt{(h-z3)^2 + l^2}}, \quad x4 = \frac{z4}{\tan(\theta)}.$$

Wherein, the coordinate point Y (0, y3, z3) is a known value.

Wherein, the observation point O, the point Y and the point Z are located on a same straight line.

In summary the naked-eye 3D image forming method of the present invention calculates a size of the present image on a plane (vertical plane) for normally displaying an image; after the display screen is titled, according a determined image forming range of a size of a preset image, projecting to the display screen, and converting to digital signals and inputting to the control module of the display device such that a displayed image in the display screen is coincided with the size of the preset image. Through a perspective principle, an image observed at an observation point neither a deformed image after titled nor a flat image, but a stereo image having a 3D effect. Accordingly, a 3D glasses is not required, and film attached naked-eye technology having higher cost is not required as well, a higher display effect can be achieved, and the present invention can be widely applied to advertising sites such as a mall.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
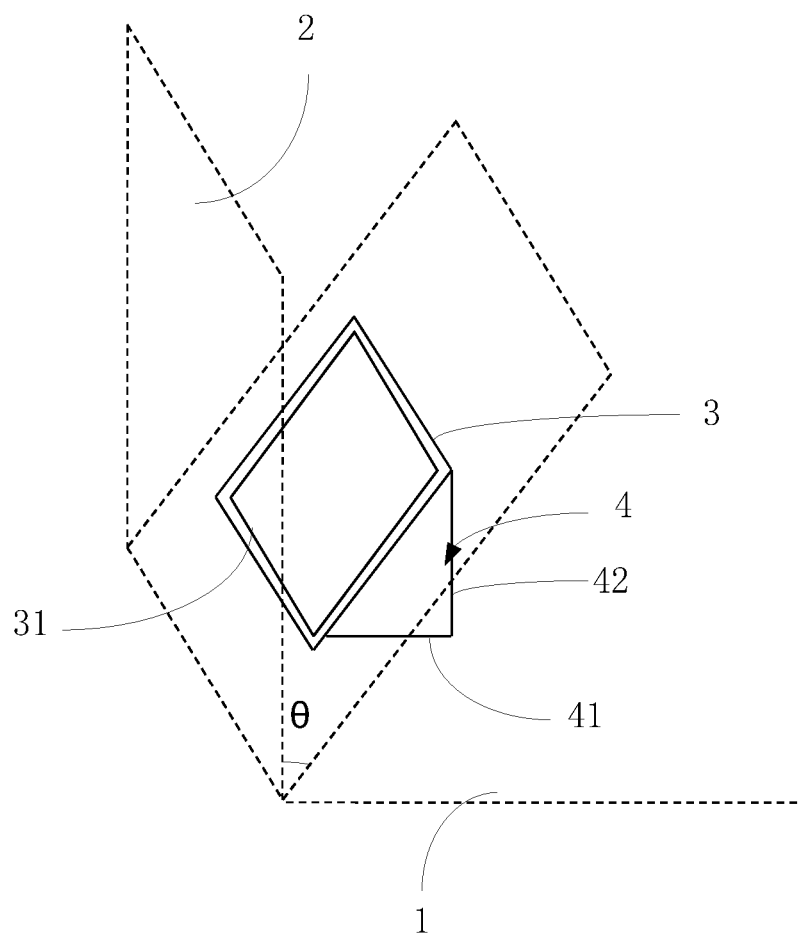
FIG. 1 is a schematic diagram of a naked-eye 3D image forming system of the present invention.

With reference to FIG. 1, an embodiment of the present invention provides a naked-eye 3D image forming system. The system includes a horizontal plane 1 and a vertical plane 2 perpendicular to the horizontal plane 1, a display device 3, a supporting body 4 for fixing the display device 3, a control system in the display device 3 is provided with an image expanding control module, the supporting body 4 installs the display device 3 on the vertical plane 2, and inclines the display device 3 toward the vertical plane 2, a display screen 31 of the display device 3 is disposed with a tilt angle θ with respective to the vertical plane 2. The image expanding control module is used for changing a dimension of a display image of the display device 3 after the display device 3 is titled in order to realize forming a three-dimensional image on the vertical plane 2.

In the present embodiment, the horizontal plane 1 can be a bottom surface such as a platform in parallel with the ground. In the present embodiment, the horizontal plane 1 is a ground, and the vertical plane 2 is a wall or a frame. The present embodiment preferably selects a wall, and the naked-eye 3D image forming system is more suitable for an advertising application or a home application, In the present embodiment, the supporting body 4 includes a carrying plate 41 and a fixing plate 42 having an included angle with respect to the carrying plate 41. The fixing plate 42 is fixed to the vertical plane 2 and is in parallel with the vertical plane 2. The carrying plate 41 carries the display device 3, and the display screen 31 is in parallel with the carrying plate 41.

Figure 2:
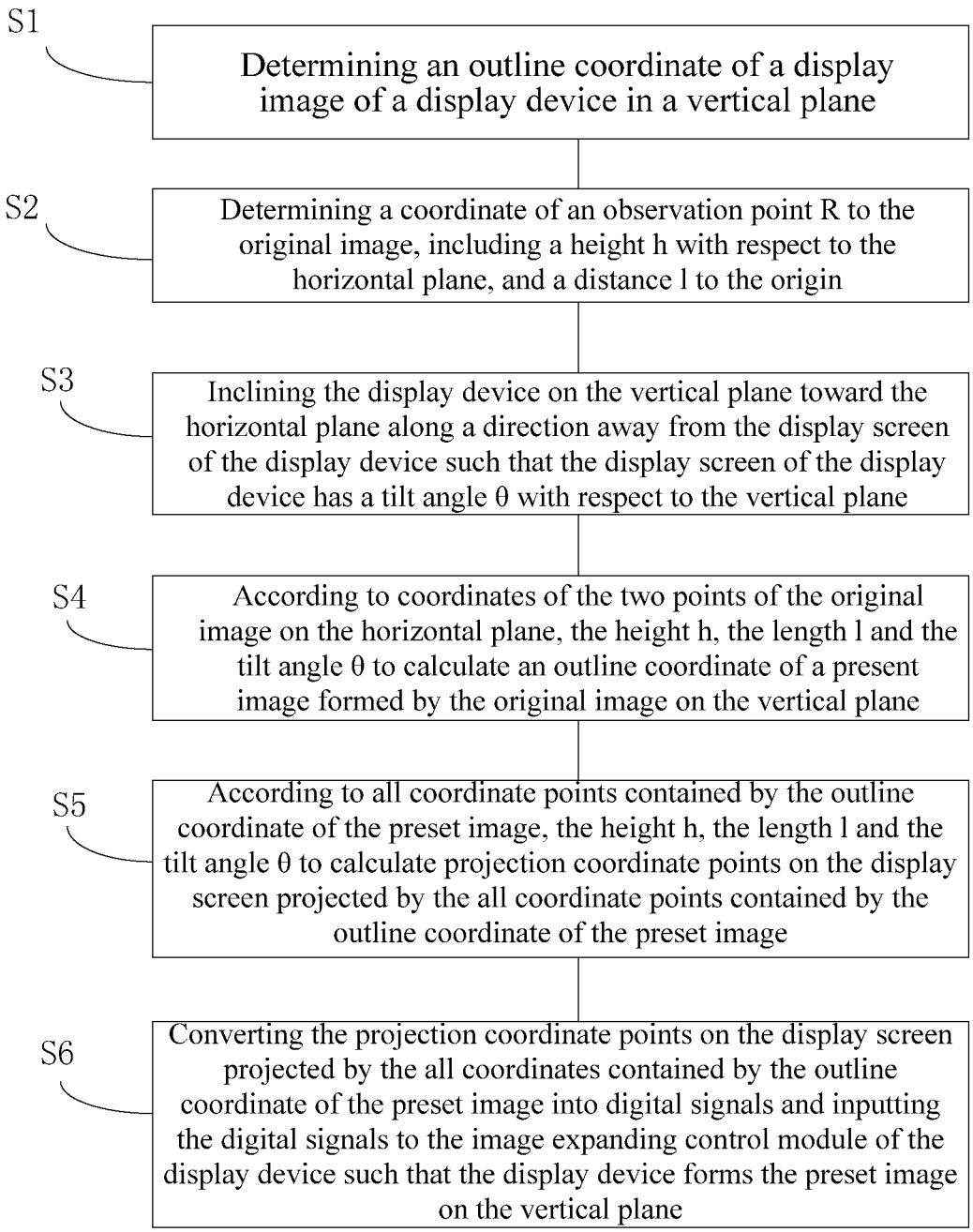
FIG. 2 is a flowchart of a naked-eye 3D image forming method of the present invention.

With reference to FIG. 2, the present invention provides a naked-eye 3D image forming method, and the method includes:

Step S1: determining an outline coordinate of a display image of a display device in a vertical plane. Wherein, the display image is an original image. A middle point of a straight line formed by two points of the original image on the horizontal plane is an origin O.

Step S2, determining a coordinate of an observation point R which is calculated from the observation point R to the original image. The coordinate of the observation point R includes a height h with respect to the horizontal plane, and a distance l from the observation point R to the origin. Wherein, the coordinate of the observation point R is (−l, 0, h) which is a known fixed value. Wherein, a location of the observation point is an average location calculated based on a location of the display device and a range of possible observation points.

Step S3, inclining the display device on the vertical plane toward the horizontal plane along a direction away from the display screen of the display device such that the display screen of the display device has a tilt angle θ with respect to the vertical plane. In the present embodiment the tilt angle θ is a known fixed value.

Figure 3:
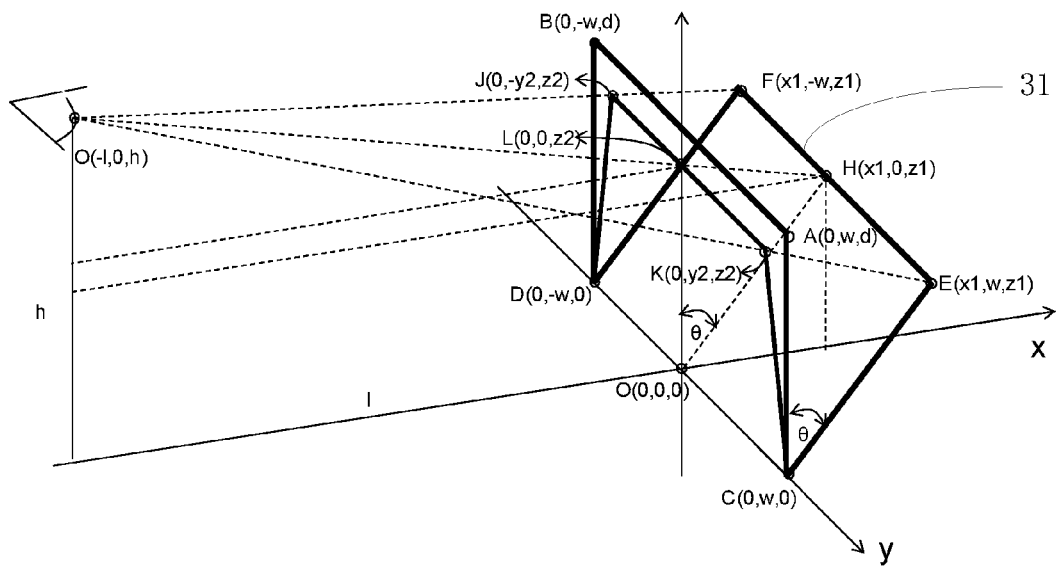
FIG. 3 is a schematic coordinate diagram of performing a calculation by the naked-eye 3D image forming method based on the naked-eye 3D image forming system according to the naked-eye 3D image forming system of the present invention.

With reference to FIG. 3, an outline of the original image is a rectangle, the outline coordinate of the original image is locations where four vertexes of the rectangle are located. The four vertexes along a clockwise direction are respectively a vertex A, a vertex B, a vertex C and a vertex D. Wherein, coordinates of the vertex C and vertex D are known fixed values. The origin is located at the middle of the vertex C and vertex D. Specifically, an image displayed by the display screen is a rectangle, the vertex C and the vertex D are coordinates of two terminal points of a side of the display screen on the horizontal plane 1, that is, vertex coordinates of two included angle of the rectangle. In the present embodiment, the coordinate of the origin O is (0, 0, 0), the coordinate of the vertex C is (0, w, 0), and the coordinate of the vertex D is (0, −w, 0), wherein w is a known value which is determined by the size of the actual screen.

Step S4, according to coordinates of the two points of the original image on the horizontal plane, the height h, the length l and the tilt angle θ to calculate an outline coordinate of a present image formed by the original image on the vertical plane. Wherein, coordinates of two points of the outline coordinate of the present image on the horizontal plane are the same as coordinates of the two points of the original image on the horizontal plane.

Furthermore, an outline of an image displayed on the display screen after the display screen is titled is a rectangle, an outline coordinate of the image displayed on the display screen after the display screen is titled is locations where four vertexes of the rectangle are located. The four vertexes along a clockwise direction are respectively a vertex F, a vertex E, and the vertex C and the vertex D. Specifically, a coordinate of the vertex F is (x1, −w1, z1) and a coordinate of the vertex E is (0, w, 0). Wherein, $x1 = d \times \sin\theta$, $z1 = d \times \cos\theta$.

An outline of the preset image is a rectangle smaller than the size of the original image. An outline coordinate of the preset image are locations of four vertexes of the rectangle formed by the preset image. The four vertexes of the outline coordinate of the preset image along a clockwise direction are respectively a vertex J (0, −y2, z2), a vertex K (0, y2, z2) and the vertex C and the vertex D. The function y2 satisfies a following condition:

$$y2 = \frac{w \times \sqrt{l^2 + (h-z2)^2}}{\sqrt{(l+x1)^2 + (h-z1)^2}};$$

the function z2 satisfies a following condition $$z2 = \frac{x1 \times (h-z1)}{(l+x1)} + z1.$$

Wherein, w is a coordinate value of the vertex C and the vertex D on the y-axis, z1 is a coordinate value of the vertex F and the vertex E on the z-axis. Therefore, according to the figure, from $$\frac{(h-z1)}{(l+x1)} = \frac{(z2-z1)}{x1}$$

to obtain from $$z2 = \frac{x1 \times (h-z1)}{(l+x1)} + z1;$$

from $$\frac{\sqrt{(l+x1)^2 + (h-z1)^2}}{w} = \frac{\sqrt{l^2 + (h-z2)^2}}{y2}$$

to obtain $$y2 = \frac{w \times \sqrt{l^2 + (h-z2)^2}}{\sqrt{(l+x1)^2 + (h-z1)^2}}.$$

Figure 4:
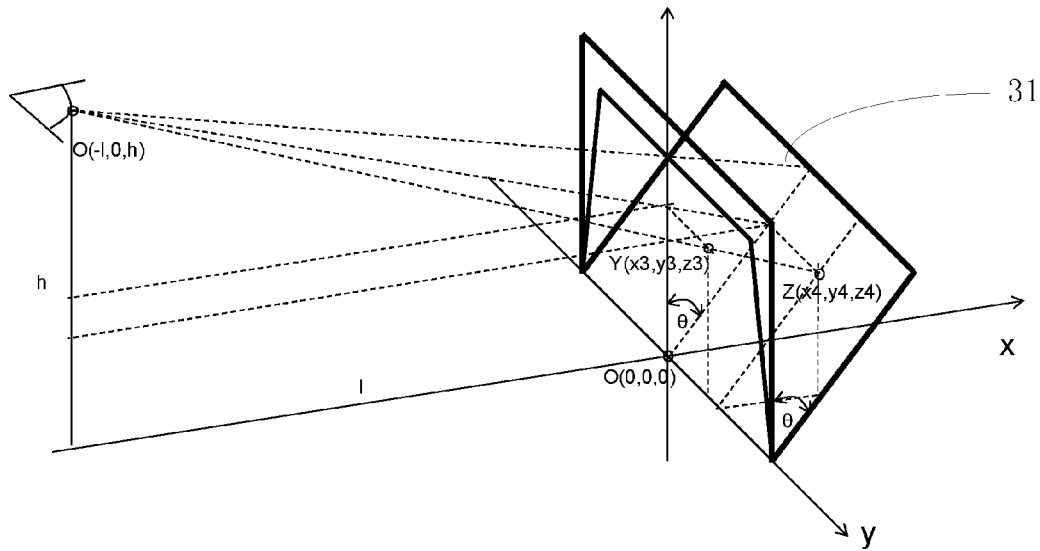
FIG. 4 is a schematic coordinate diagram of performing a calculation by the naked-eye 3D image forming method based on the naked-eye 3D image forming system according to the naked-eye 3D image forming system of the present invention.

With reference to FIG. 4, in a step S5, according to all coordinate points contained by the outline coordinate of the preset image, the height h, the length l and the tilt angle θ to calculate projection coordinate points on the display screen projected by the all coordinate points contained by the outline coordinate of the preset image. This step mainly performs a cutting process for an image formed by the titled display screen on the vertical plane to remove a portion that exceeds the outline of the preset image in order to prevent an image from deforming.

Furthermore, a projection coordinate point Z (x4, y4, z4) on the display screen projected by an arbitrary coordinate point Y (0, y3, z3) in the all coordinates contained by the outline coordinate of the preset image satisfies a flowing condition:

$$z4 = \frac{z3 \times \tan(\theta)}{\left(\frac{(h-z3)}{l} + \tan(\theta)\right)}, \quad y4 = \frac{y3 \times \sqrt{(h-z4)^2 + (l+x4)^2}}{\sqrt{(h-z3)^2 + l^2}}, \quad x4 = \frac{z4}{\tan(\theta)}.$$

Wherein, the coordinate point Y (0, y3, z3) is a known value. Specifically, from $$\tan(\theta) = \frac{z4}{x4}, \quad \frac{(h-z3)}{l} = \frac{(z3-z4)}{x4},$$

$$\frac{\sqrt{(h-z4)^2 + (l+x4)^2}}{y4} = \frac{\sqrt{(h-z3)^2 + l^2}}{y3}.$$

deducing $$z4 = \frac{z3 \times \tan(\theta)}{\left(\frac{(h-z3)}{l} + \tan(\theta)\right)}.$$

Therefore, z4 is a known value, and from $$x4 = \frac{z4}{\tan(\theta)}$$

so that the value of x4 can be obtained. Finally, x4 and z4 are known values to obtain $$y4 = \frac{y3 \times \sqrt{(h-z4)^2 + (l+x4)^2}}{\sqrt{(h-z3)^2 + l^2}}.$$

Wherein, a connection line between the observation point R and an outline coordinate projected by the preset image is a straight line, and the outline coordinate of the preset image is located at the straight line.

Step S6, converting the projection coordinate points on the display screen projected by the all coordinates contained by the outline coordinate of the preset image into digital signals and inputting the digital signals to the image expanding control module of the display device such that the display device forms the preset image on the vertical plane.

In summary the naked-eye 3D image forming method of the present invention calculates a size of the present image on a plane (vertical plane) for normally displaying an image; after the display screen is titled, according a determined image forming range of a size of a preset image, projecting to the display screen, and converting to digital signals and inputting to the control module of the display device such that a displayed image in the display screen is coincided with the size of the preset image. Through a perspective principle, an image observed at an observation point neither a deformed image after titled nor a flat image, but a stereo image having a 3D effect. Accordingly, a 3D glasses is not required, and film attached naked-eye technology having higher cost is not required as well, a higher display effect can be achieved, and the present invention can be widely applied to advertising sites such as a mall.

Furthermore, each of the projection coordinate points on the display screen corresponds to one pixel unit of the display device.

Furthermore, the observation point O, the point Y and the point Z are located on a same straight line.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A naked-eye 3D image forming method, comprising:
    determining an outline coordinate of a display image of a display device in a vertical plane, wherein, the display image is an original image, and a middle point of a straight line formed by two points of the original image on a horizontal plane is an origin O;
    determining a coordinate of an observation point R which is calculated from the observation point R to the original image, wherein, the coordinate of the observation point R includes a height h with respect to the horizontal plane, and a distance 1 from the observation point R to the origin O;
    inclining the display device on the vertical plane toward the horizontal plane along a direction away from the display screen of the display device such that the display screen of the display device has a tilt angle θ with respect to the horizontal plane;
    based on coordinates of the two points of the original image on the horizontal plane, the height h, the length 1 and the tilt angle, calculating an outline coordinate of a present image formed by the original image on the vertical plane wherein coordinates of two points of the outline coordinate of the present image on the horizontal plane are the same as coordinates of the two points of the original image on the horizontal plane;
    based on all coordinate points contained by the outline coordinate of the preset image, the height h, the length 1 and the tilt angle θ, calculating projection coordinate points on the display screen projected by the all coordinate points contained by the outline coordinate of the preset image, wherein, a connection line between the observation point R and the outline coordinate of the present image is a straight line, and the outline coordinate of the present image is at the straight line; and
    converting the projection coordinate points on the display screen projected by the all coordinates contained by the outline coordinate of the preset image into digital signals and using the digital signals the display device forms the preset image on the vertical plane.

2. The naked-eye 3D image forming method according to claim 1, wherein, each of the projection coordinate points on the display screen corresponds to one pixel unit of the display device.

3. The naked-eye 3D image forming method according to claim 1, wherein, an outline of the original image is a rectangle, the outline coordinate of the original image is locations where four vertexes of the rectangle are located; the four vertexes along a clockwise direction are respectively a vertex A, a vertex B, a vertex C and a vertex D; wherein, coordinates of the vertex C and vertex D are predetermined fixed values and the origin O is located at the middle of the vertex C and vertex D.

4. The naked-eye 3D image forming method according to claim 3, wherein, an outline of an image displayed on the display screen after the display screen is tilted is a rectangle, an outline coordinate of the image displayed on the display screen after the display screen is tilted are locations where four vertexes of the rectangle are located and the four vertexes along a clockwise direction are respectively a vertex F, a vertex E, and the vertex C and the vertex D.

5. The naked-eye 3D image forming method according to claim 4, wherein, an outline of the preset image is a rectangle smaller than the size of the original image and the outline coordinate of the preset image are locations of four vertexes of the rectangle formed by the preset image.

6. The naked-eye 3D image forming method according to claim 5, wherein, the four vertexes of the outline coordinate of the preset image along a clockwise direction are respectively a vertex J (0, −y2, z2), a vertex K (0, y2, z2) and the vertex C and the vertex D; a function y2 satisfies a following condition:

$$y2 = \frac{w \times \sqrt{l^2 + (h-z2)^2}}{\sqrt{(l+x1)^2 + (h-z1)^2}};$$

a function z2 satisfies a following condition $$z2 = \frac{x1 \times (h-z1)}{(l+x1)} + z1;$$

wherein, w is a coordinate value of the vertex C and the vertex D on the y-axis, z1 is a coordinate value of the vertex F and the vertex E on the z-axis, and x1 is a coordinate value of the vertex F and the vertex E on the x-axis.

7. The naked-eye 3D image forming method according to claim 6, wherein, a projection coordinate point Z (x4, y4, z4) on the display screen projected by an arbitrary coordinate point Y (0, y3, z3) in the all coordinates contained by the outline coordinate of the preset image satisfies a flowing condition:

$$z4 = \frac{z3 \times \tan(\theta)}{\left(\frac{(h-z3)}{l} + \tan(\theta)\right)}, \quad y4 = \frac{y3 \times \sqrt{(h-z4)^2 + (l+x4)^2}}{\sqrt{(h-z3)^2 + l^2}}, \quad x4 = \frac{z4}{\tan(\theta)}.$$

wherein, the coordinate point Y (0, y3, z3) is a predetermined value.

8. The naked-eye 3D image forming method according to claim 5, wherein, the observation point O, the point Y and the point Z are located on a same straight line.

* * * * *